(12) United States Patent
Otani

(10) Patent No.: US 9,170,120 B2
(45) Date of Patent: Oct. 27, 2015

(54) VEHICLE NAVIGATION PLAYBACK METHOD

(75) Inventor: Kazuoki Otani, Yokohama (JP)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 1997 days.

(21) Appl. No.: 12/075,978

(22) Filed: Mar. 14, 2008

(65) Prior Publication Data

US 2008/0234934 A1    Sep. 25, 2008

Related U.S. Application Data

(60) Provisional application No. 60/919,357, filed on Mar. 22, 2007.

(51) Int. Cl.
| | | |
|---|---|---|
| G01C 21/00 | (2006.01) | |
| G08G 1/123 | (2006.01) | |
| G01C 21/36 | (2006.01) | |
| G10L 13/00 | (2006.01) | |
| G08G 1/0968 | (2006.01) | |

(52) U.S. Cl.
CPC ............ *G01C 21/3629* (2013.01); *G10L 13/00* (2013.01); *G01C 21/365* (2013.01); *G01C 21/3632* (2013.01); *G08G 1/096855* (2013.01); *G08G 1/096872* (2013.01)

(58) Field of Classification Search
CPC ............ G01C 1/3629; G01C 21/3632; G01C 21/365; G08G 1/096855; G08G 1/096861; G08G 1/096866; G08G 1/096872

USPC ................ 701/23–25, 35–36, 200–202, 204, 701/206–209, 211–213, 300, 431, 432, 433, 701/436, 437, 440, 441, 443; 340/988–990, 340/995.1, 995.12, 995.14, 995.17–995.2, 340/995.23, 995.27, 995.24; 704/258–260; 379/908
See application file for complete search history.

(56) References Cited

U.S. PATENT DOCUMENTS

| | | | | |
|---|---|---|---|---|
| 5,592,389 | A * | 1/1997 | La Rue et al. ................ | 701/211 |
| 5,774,828 | A * | 6/1998 | Brunts et al. ................. | 701/210 |
| 5,839,086 | A * | 11/1998 | Hirano .......................... | 701/201 |
| 5,844,505 | A * | 12/1998 | Van Ryzin .................... | 340/988 |
| 5,938,721 | A * | 8/1999 | Dussell et al. ............... | 701/211 |
| 6,208,932 | B1 * | 3/2001 | Ohmura et al. .............. | 701/200 |
| 6,266,614 | B1 * | 7/2001 | Alumbaugh .................. | 701/211 |
| 6,321,158 | B1 * | 11/2001 | DeLorme et al. ............ | 701/201 |
| 6,421,607 | B1 | 7/2002 | Gee et al. | |
| 6,801,763 | B2 * | 10/2004 | Elsey et al. ................ | 455/404.1 |
| 7,096,116 | B2 * | 8/2006 | Tanaka et al. ................ | 701/200 |
| 2002/0152067 | A1 * | 10/2002 | Viikki et al. ................. | 704/231 |
| 2002/0165666 | A1 * | 11/2002 | Fuchs et al. .................. | 701/209 |
| 2003/0004724 | A1 * | 1/2003 | Kahn et al. ................... | 704/260 |
| 2003/0212559 | A1 * | 11/2003 | Xie .............................. | 704/260 |
| 2005/0261825 | A1 | 11/2005 | Nix et al. | |
| 2006/0029109 | A1 * | 2/2006 | Moran ......................... | 370/538 |
| 2006/0069500 | A1 * | 3/2006 | Hashizume .................. | 701/209 |

(Continued)

*Primary Examiner* — Jack W Keith
*Assistant Examiner* — Chuong P Nguyen
(74) *Attorney, Agent, or Firm* — Laurence S. Roach, Esq.

(57) ABSTRACT

An automotive vehicle navigation method includes obtaining electronic textual navigation information and converting the textual navigation information into audio data. The audio data is stored within the vehicle and is played back within the vehicle in sequential increments that correspond to respective legs of a trip being made by the vehicle.

2 Claims, 11 Drawing Sheets

(56) References Cited

U.S. PATENT DOCUMENTS

| | | | |
|---|---|---|---|
| 2007/0094029 A1* | 4/2007 | Saito et al. | 704/260 |
| 2007/0150175 A1* | 6/2007 | Shen et al. | 701/200 |
| 2007/0150188 A1* | 6/2007 | Rosenberg | 701/211 |
| 2009/0024322 A1* | 1/2009 | Tomita et al. | 701/211 |
| 2009/0076821 A1* | 3/2009 | Brenner et al. | 704/260 |

* cited by examiner

VEHICLE NAVIGATION PLAYBACK METHOD

CROSS-REFERENCE TO RELATED APPLICATIONS

This application claims the benefit of U.S. Provisional Patent Application Ser. No. 60/919,357, filed 22 Mar. 2007 and entitled VEHICLE NAVIGATION PLAYBACK METHOD.

BACKGROUND OF THE INVENTION

1. Field of the Invention

The present invention relates generally to electronic vehicle navigation systems.

2. Description of the Related Art

Navigation systems are provided in vehicles, such as automobiles, for providing assistance to occupants of the vehicles in finding their way to their destinations. The navigation system typically includes a global positioning system (GPS) that tracks the changing locations of the vehicle on the surface of the earth in real time. The navigation system also stores extensive map data that enables the navigation system to track the changing street locations of the vehicle based upon the GPS data. A video screen may display the mapping of streets in the vicinity of the vehicle, as well as the current location of the vehicle on the grid of interconnected roadways.

One difficulty associated with the above-described navigation systems is that they typically do not provide text instructions regarding what streets to turn on and the distances involved. Rather, only a map with the current location of the vehicle thereon is provided. However, because of the spatial skills required, many users find maps inherently difficult to read, especially while driving. Hence, such users may find text directions to be easier to understand and more useful.

Another difficulty is that the world-wide map information utilized by conventional navigation systems requires a large amount of memory capacity to store, as well as considerable processing capability to display. These memory and processing requirements, and their associated costs, result in the system designer having to make compromises in the detail and user-friendliness of the display of the navigation maps.

Yet another difficulty is that conventional navigation systems typically provide navigation information in only video form, and do not provide navigation information in audio form. Thus, it may be difficult for a driver to interpret the visual information on the video screen while still watching the road while he is driving.

What is needed in the art is a vehicle navigation system that is capable of supplying navigation directions in text and/or audio form, that provides higher quality graphical information, and that enables the user to access the navigation information at desired times of his choosing.

SUMMARY OF THE INVENTION

The present invention is directed to a vehicle navigation system in which both textual and graphical navigation information is downloaded from a web-based source and uploaded into the vehicle navigation system, such as by using a personal electronic device as a transfer medium. The user may then access the navigation information in graphical, textual, and/or audial form at times of his choosing, and may interrupt other active infotainment sources in doing so. The vehicle's GPS system may be utilized to control the timing of the graphical, textual, and/or audial presentations of the navigation information so that the user is provided with the information when it is needed.

The invention comprises, in one embodiment thereof, an automotive vehicle navigation method including obtaining electronic textual navigation information and converting the textual navigation information into audio data. The audio data is stored within the vehicle and is played back within the vehicle in sequential increments that correspond to respective legs of a trip being made by the vehicle.

The invention comprises, in another embodiment thereof, an automotive vehicle navigation method including providing audio navigation data within the vehicle. Second audio data is audibly played within the vehicle. The playing of the second audio data is repeatedly interrupted by audibly playing back the audio navigation data in sequential increments in association with respective legs of a trip being made by the vehicle.

The invention comprises, in yet another embodiment thereof, an automotive vehicle navigation method including storing audio navigation data and/or textual navigation data within the vehicle. Vehicle location data is received in real time and is used to determine the vehicle's progress in a trip being made by the vehicle. The audio navigation data and/or textual navigation data is played back within the vehicle in sequential increments that correspond to the vehicle's progress in the trip.

An advantage of the present invention is that the user may receive navigation directions in text form.

Another advantage is that the user may receive navigation directions in audio form.

Yet another advantage is that higher quality graphical navigation information is provided.

A further advantage is that the navigation system enables the user to access the navigation information on an as-needed basis.

A still further advantage is that the user may interrupt other streams of infotainment content to receive the navigation information in visual or audial form.

BRIEF DESCRIPTION OF THE DRAWINGS

The above-mentioned and other features and advantages of the invention will become more apparent to one with skill in the art upon examination of the following figures and detailed description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PRESENTLY PREFERRED EMBODIMENTS

Figure 1:
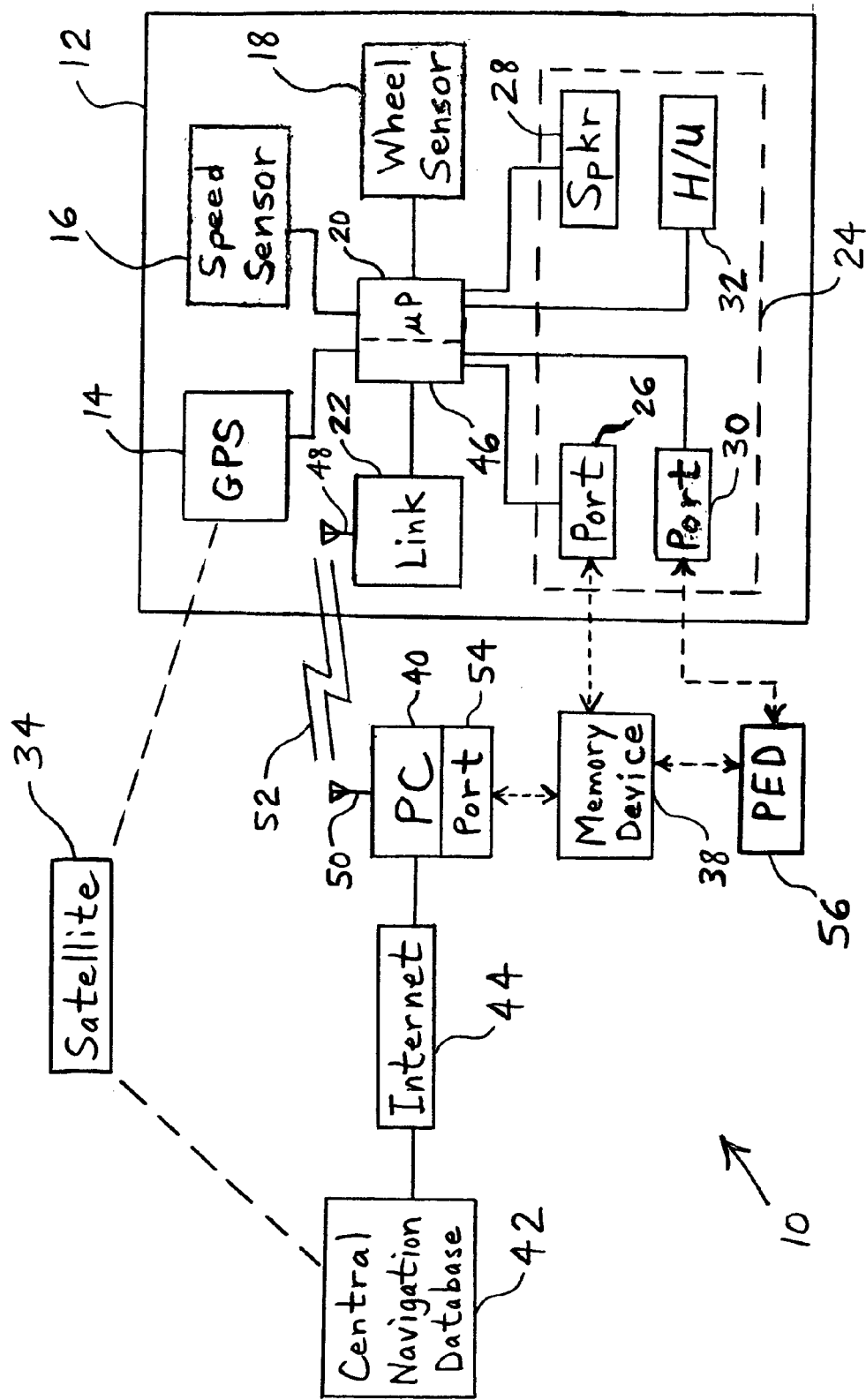
FIG. 1 is a block diagram of one embodiment of a navigation system of the present invention.

Referring to FIG. 1, there is shown one embodiment of a vehicle navigation system 10 of the present invention for a vehicle 12. In one embodiment, vehicle 12 is a type of vehicle that travels on roads, such as an automobile or truck, for example. Within vehicle 12 may be navigation system components such as global positioning system (GPS) module 14, speed sensor 16, wheel sensor 18, processor 20, communications link 22, and a user interface 24 including port 26, audio speaker 28, port 30, and head unit 32. In addition to the components within vehicle 12, navigation system 10 may include satellite 34, electronic memory device 38, personal electronic device (PED) 56, and a personal computer (PC) 40 in communication with a central navigation database 42 through the Internet 44.

Database 42 may be a commercially accessible, searchable source of navigation information, such as may be provided by MAPQUEST or GOOGLE MAPS, for example. Before a trip is commenced, a user may specify a trip to be made by vehicle 12, e.g., the trip's beginning and ending coordinates, as a search term of database 42. As described in more detail below, in response to the search request, navigation information may be retrieved from database 42 and downloaded to vehicle 12.

Satellite 34, GPS 14, speed sensor 16 and wheel sensor 18 may together form a vehicle positioning apparatus that determines location data associated with vehicle 12. GPS 14, speed sensor 16, wheel sensor 18 and satellite 34 may cooperate to continually pinpoint the exact location of vehicle 12 on the surface of earth, expressed in latitude and longitude, as is well known. The change in the vehicle location over time, as determined by GPS 14 and satellite 34, provides some indication of the direction in which vehicle 12 is heading, i.e., the heading direction. However, GPS 14 and satellite 34 may not be sufficient to accurately ascertain the heading direction of vehicle 12 when vehicle 12 has recently made a turn. Thus, in order to more accurately determine the heading direction, wheel sensor 18 may provide the direction in which the wheels, e.g., front wheels, of vehicle 12 are turned, and speed sensor 16 may provide the speed of vehicle 12 while vehicle 12 is turning in the directions determined by the positions of the wheels. By analyzing the signals from speed sensor 16 in conjunction with the signals from wheel sensor 18, processor 20 may determine the change in heading direction as compared to the more generalized heading direction provided by satellite 34 and GPS 14. It is also possible, in another embodiment, for the heading direction of the vehicle to be at least partially determined by use of a compass on-board vehicle 12.

Processor 20 may include an electronic memory device 46 that stores navigation information, e.g., maps, audio-based directions and text-based directions, which may be downloaded from database 42 via Internet 44 and PC 40, and which may be uploaded to vehicle 12 via link 22, memory device 38, and/or PED 56. That is, the navigation information may originate in central navigation database 42, and may be transferred to memory device 46 by any of various routes. In one embodiment, the navigation information is transferred from database 42 to memory device 46 via Internet 44, PC 40, antenna 50, antenna 48 and communications link 22. PC 40 may be disposed inside a building (not shown) adjacent to which vehicle 12 is parked. The navigation information may then be transmitted from antenna 50 to antenna 48 via air-borne signals, as indicated at 52.

In another embodiment, the navigation information is transferred from PC 40 to memory device 46 via PC port 54, memory device 38 and port 26. Memory device 38 may be in the form of a secure digital memory card, commonly known as an "SD memory card". In other embodiments, memory device 38 may be in the form of an SDIO (secure digital input/output) card, a USB memory or flash drive, a compact flash card, or a memory stick, for example. Memory device 38 may be inserted into port 54 so that PC 40 may write the navigation information onto memory device 38. Memory device 38 may then be inserted into port 26 such that the contents of device 38 may be read and copied into memory device 46.

In yet another embodiment, the navigation information is transferred from PC 40 to memory device 46 via PC port 54, memory device 38, PED 56 and port 30. Memory device 38 may be inserted into port 54 so that PC 40 may write the navigation information onto memory device 38. Memory device 38 may then be inserted into PED 56 such that PED 56 may process the contents of device 38 and may display the contents on a display screen (not shown) of PED 56. PED 56 may then be inserted into port 30, or otherwise connected to port 30 such as via a communication wire, such that the contents of memory device 38 may be read and copied into memory device 46. PED 56 may be in the form of an MP3 player, iPod® or other brand of portable media player, for example. It is possible for PED 56 to include internal memory (not shown) that may perform the function of memory device 38 and thereby enable PED 56 to be directly connected to port 54. As described above, processor 20 is communicatively coupled to the vehicle positioning apparatus (including satellite 34, GPS 14, speed sensor 16 and wheel sensor 18) and to the source of navigation information (including link 22 and ports 26, 30).

Figure 2:
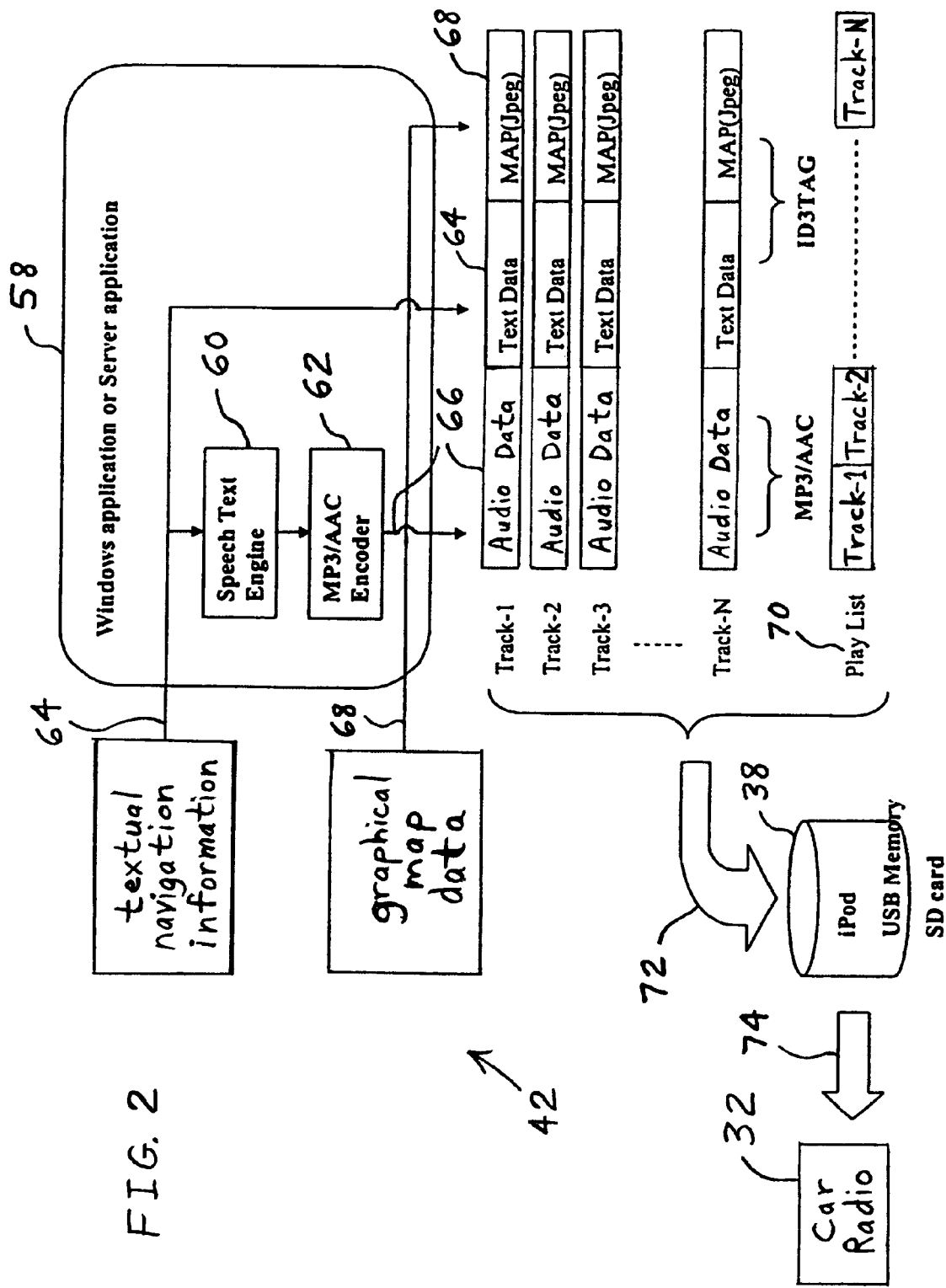
FIG. 2 is a diagram of one embodiment of the data flow of the navigation system of FIG. 1.

PC 40 may include a WINDOWS or server application 58 (FIG. 2) including a Speech Text Engine 60 and an MP3/AAC (advanced audio coding)/WMA (Windows Media Audio) Encoder 62 which may cooperate to translate textual navigation information 64 from database 42 into audio data 66 that may be played back on speaker 28. Application 58 may compile or otherwise organize audio data 66 and navigation information taken directly from database 42, such as textual data 64 and graphical map data 68, into Tracks 1 through N, as shown in FIG. 2. In one embodiment, text data 64 and map data 68 are in the form of standard audio format tags, e.g., ID3 tags, which are associated with the respective portion of audio data 66 that is in the same track as the text data and map data.

Each track may correspond to a respective navigation instruction retrieved from database 42. For example, Track 1 may correspond to the first instruction, "Head north on GA-74 toward Dividend Dr", that is retrieved from database 42; and Track 2 may correspond to the second instruction, "Turn right at GA-54 E", etc. Thus, tracks may be sequential increments of navigation information that are associated with respective legs of a trip being made by vehicle 12. Application 58 may compile or otherwise organize the sequential tracks into a Play List 70 that may specify the order in which the tracks may be played back for and by the user. As indicated by arrow 72 in FIG. 2, the navigation information as organized into tracks and a play list may be transferred to a memory device 38, or to some equivalent memory device incorporated in PED 56. As indicated by arrow 74, the navigation information then may be transferred to a memory device 46 in a car radio or other infotainment module having a head unit 32. It is also possible for the navigation information to be transferred from PC 40 to memory device 46 via antennae 48, 50 and link 22.

Figure 3:
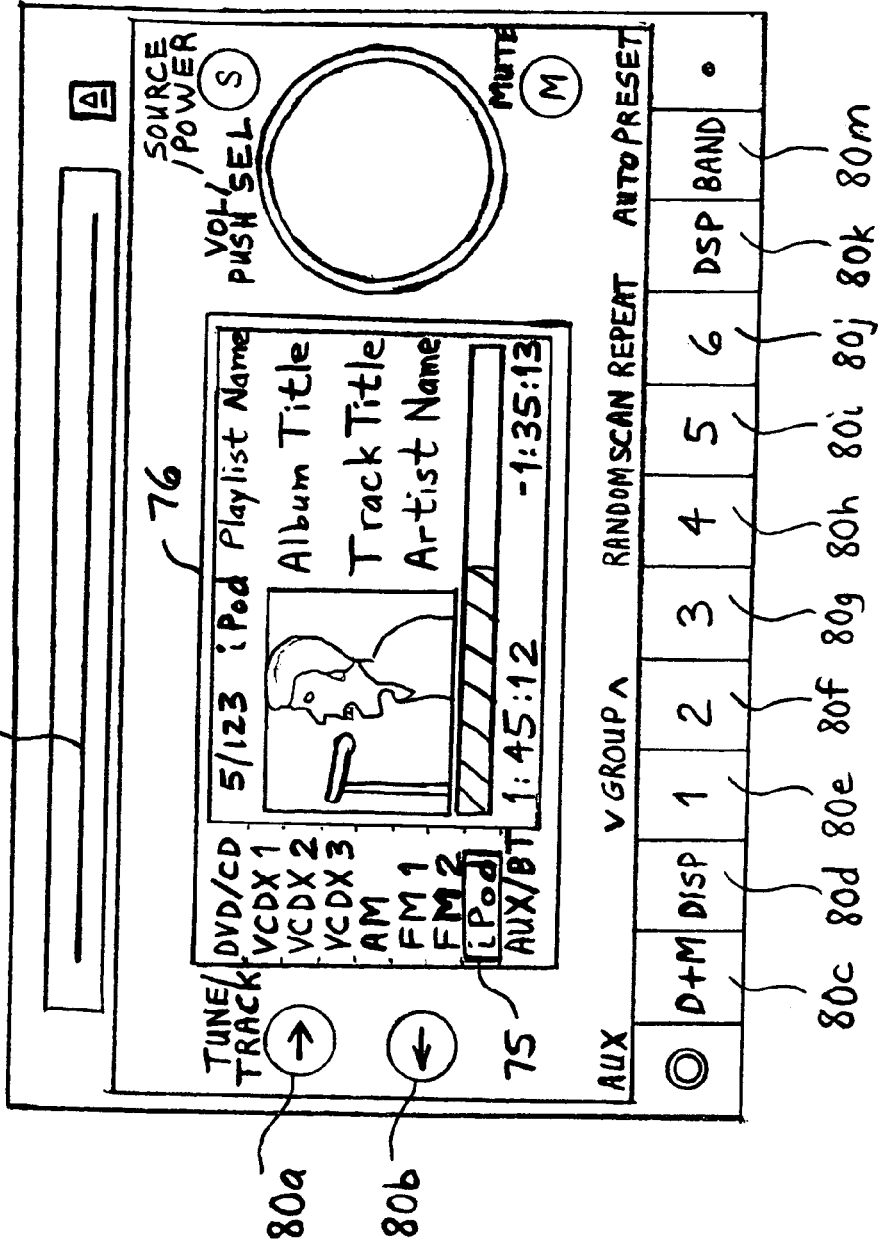
FIG. 3 is a plan view of the head unit of FIG. 1 in audio mode.

Head unit 32 is shown in more detail in FIG. 3, wherein head unit 32 is in its audio mode, and, more particularly, in its iPod sub-mode within its audio mode, as indicated by rectangular sub-mode indicator 75. Head unit 32 may include a graphical display screen 76 that may be in the form of a quarter video graphics array (QVGA). Display screen 76 may be communicatively coupled to processor 20, and may display audio information, such as album title, track title and artist name, while in the audio mode, and may display graphical and/or textual navigation information while in the direction mode.

Head unit 32 may include a conventional slot 78 for receiving a CD or DVD, and may also include pushbuttons 80*a-m* which may perform dual functions that depend on whether head unit 32 is in audio mode or direction mode. For example, in the embodiment shown, pushbuttons 80*a-b* may be "UP" and "DOWN" pushbuttons, respectively. Pushbuttons 80*a-b* may be used to switch between the audio mode and the direction mode, may be used to switch between sub-modes within the audio mode and the direction mode, and may be used to switch between options within the sub-modes, as described in more detail hereinbelow with reference to FIG. 4.

Figure 4:
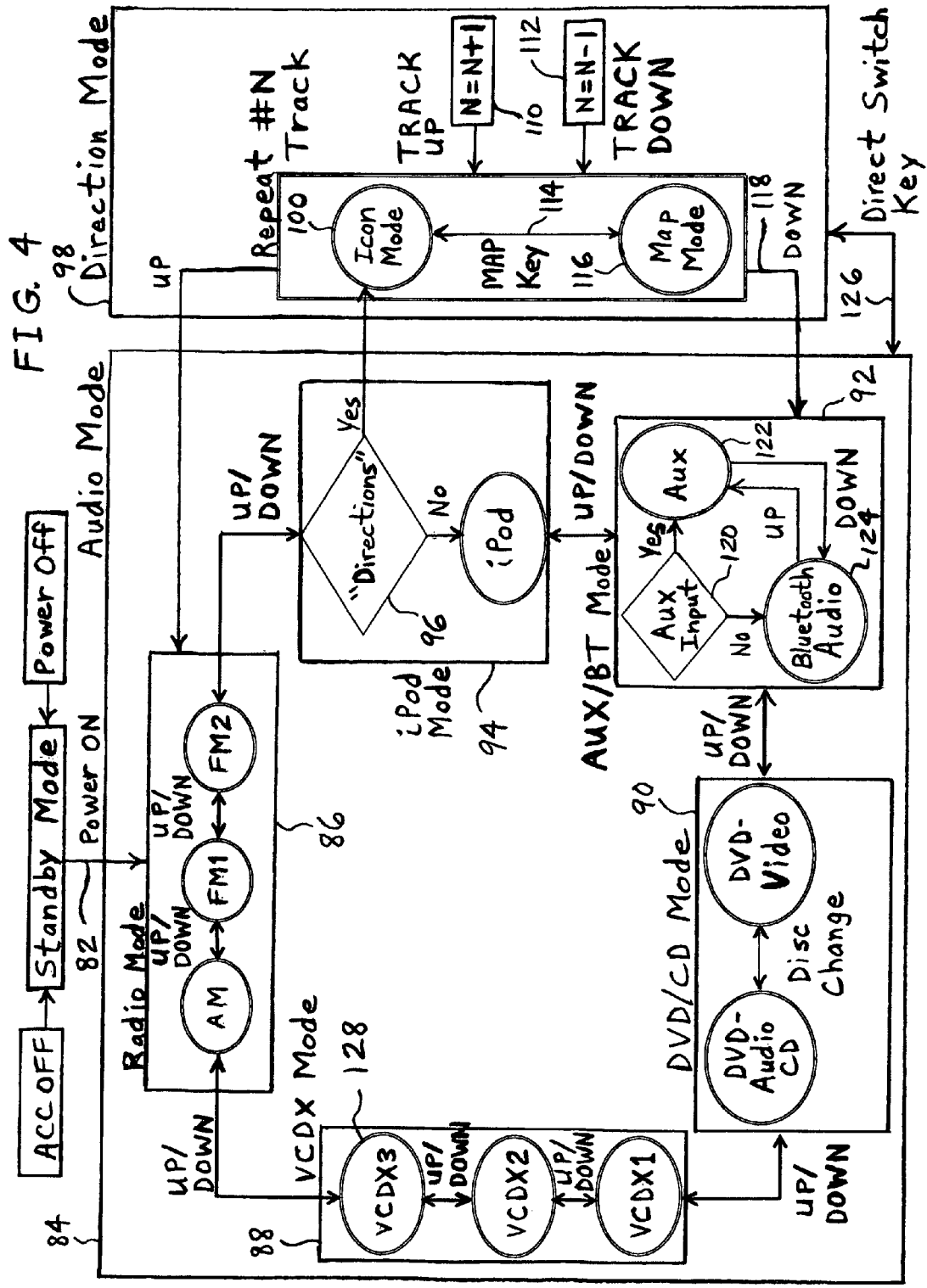
FIG. 4 is a flow chart of one embodiment of the operation of the navigation system of FIG. 1.

In one embodiment, upon powering ON, as indicated at 82 in FIG. 4, system 10 enters audio mode 84, and, more particularly, radio sub-mode 86. Within audio mode 84, a user may use UP and DOWN pushbuttons 80*a*, 80*b* to toggle through radio sub-mode 86, very compact digital exchange (VCDX) sub-mode 88, DVD/CD sub-mode 90, Auxiliary/Bluetooth (AUX/BT) sub-mode 92, and iPod sub-mode 94. Further, a user may use UP and DOWN pushbuttons 80*a*, 80*b* to toggle through the various options within the sub-modes. In a particular embodiment, a user may use UP pushbutton 80*a* to proceed through the audio sub-modes and options therein in a counterclockwise direction with reference to the layout of FIG. 4. Conversely, the user may use DOWN pushbutton 80*b* to similarly proceed in a clockwise direction.

Upon entering iPod sub-mode 94, it is determined at 96 whether an iPod or other PED 56 connected to port 30 has navigation information for display or playback on head unit 32. If so, system 10 may enter direction mode 98, and, more particularly, icon sub-mode 100. In a particular embodiment illustrated in FIG. 5, a user may select a direction play list, as shown at 102, from an iPod menu 104 to thereby start the direction play list, as shown at 106. In icon sub-mode 100 (FIG. 4), display 76, as shown in FIG. 6, may display text and or graphic images representing text data 64 of individual tracks of navigation information retrieved from database 42. In the specific illustration of FIG. 6, the displayed text data 64 includes a textual indication of distance, such as "0.2 miles", a textual indication of the track number associated with the image, such as "5", and a textual direction or instruction, such as "Take the Virginia Exit". Text data 64 may also include some graphical image data, such as directional arrow icon 108. Speaker 28 may audibly playback a voice speaking the non-graphical portions of text data 64. For example, concurrently with the display of the image illustrated in FIG. 6, a simulated or computer generated voice may state "Step 5, after driving zero point two miles, take the Virginia exit".

In one embodiment, the computer generated voice interrupts the normal audible playing of audio mode 84. When the computer generated voice has completed stating the directions, speaker 28 may automatically return to the normal audible playing of audio mode 84, even while display screen 76 continues to display navigation information within direction mode 98. If the user would like to hear the spoken directions again, he may press a repeat pushbutton 80*j* to do so.

The user may use TRACK DOWN and TRACK UP pushbuttons 80*c*, 80*d* to switch between tracks of navigation information. Specifically, the user may press TRACK UP pushbutton 80*d*, as indicated at 110 in FIGS. 4 and 5, to play back the next track in the sequence. That is, with the Track 5 navigation information being displayed as shown in FIG. 6, pressing TRACK UP pushbutton 80*d* may result in text display of the Track 6 navigation information as well as audio playback of the voice speaking the Track 6 navigation information. Conversely, the user may press TRACK DOWN pushbutton 80*c*, as indicated at 112 in FIGS. 4 and 5, to play back the previous track in the sequence. That is, with the Track 5 navigation information being displayed as shown in FIG. 6, pressing TRACK DOWN pushbutton 80*c* may result in text display of the Track 4 navigation information as well as audio playback of the voice speaking the Track 4 navigation information.

Figure 6:
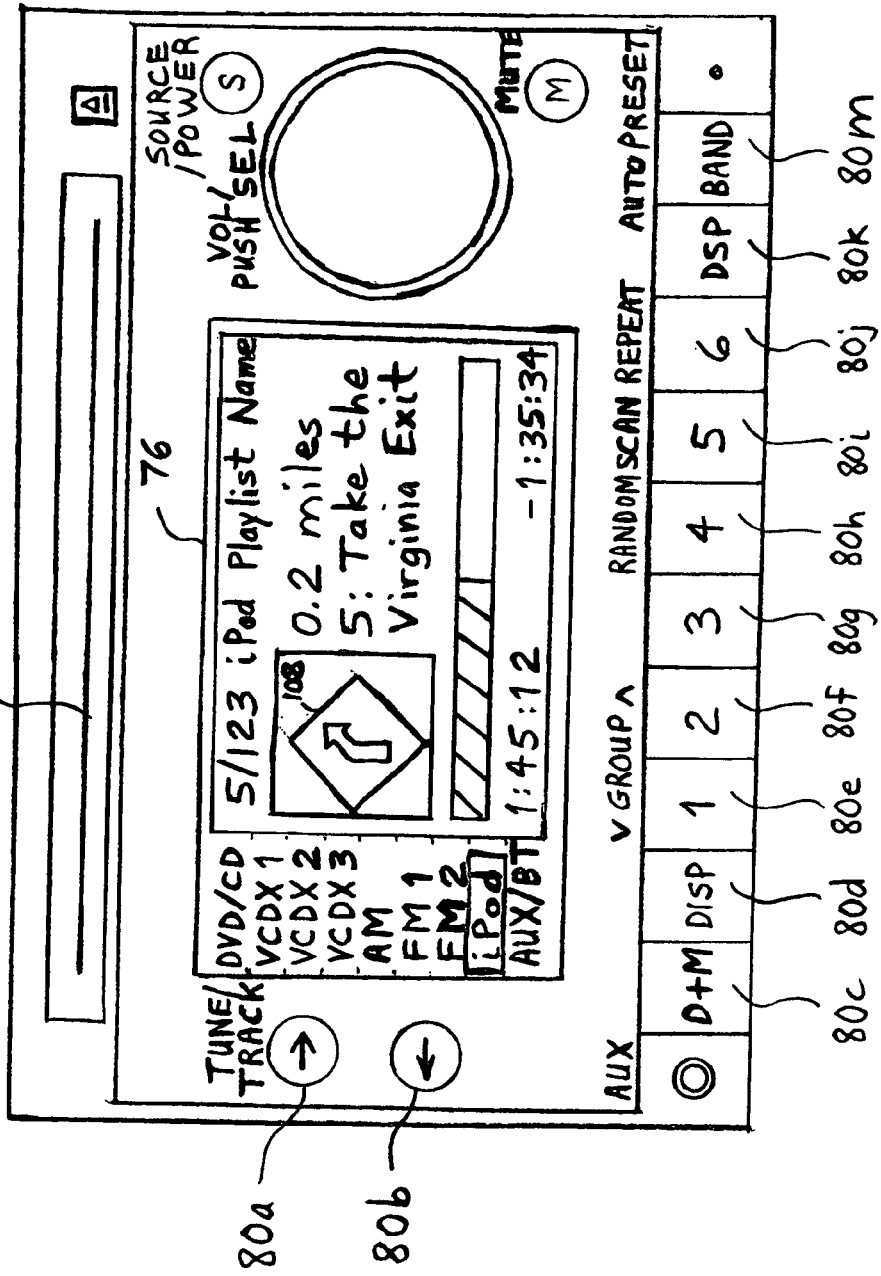
FIG. 6 is a plan view of the head unit of FIG. 1 in the icon sub-mode of the direction mode.
Figure 7:
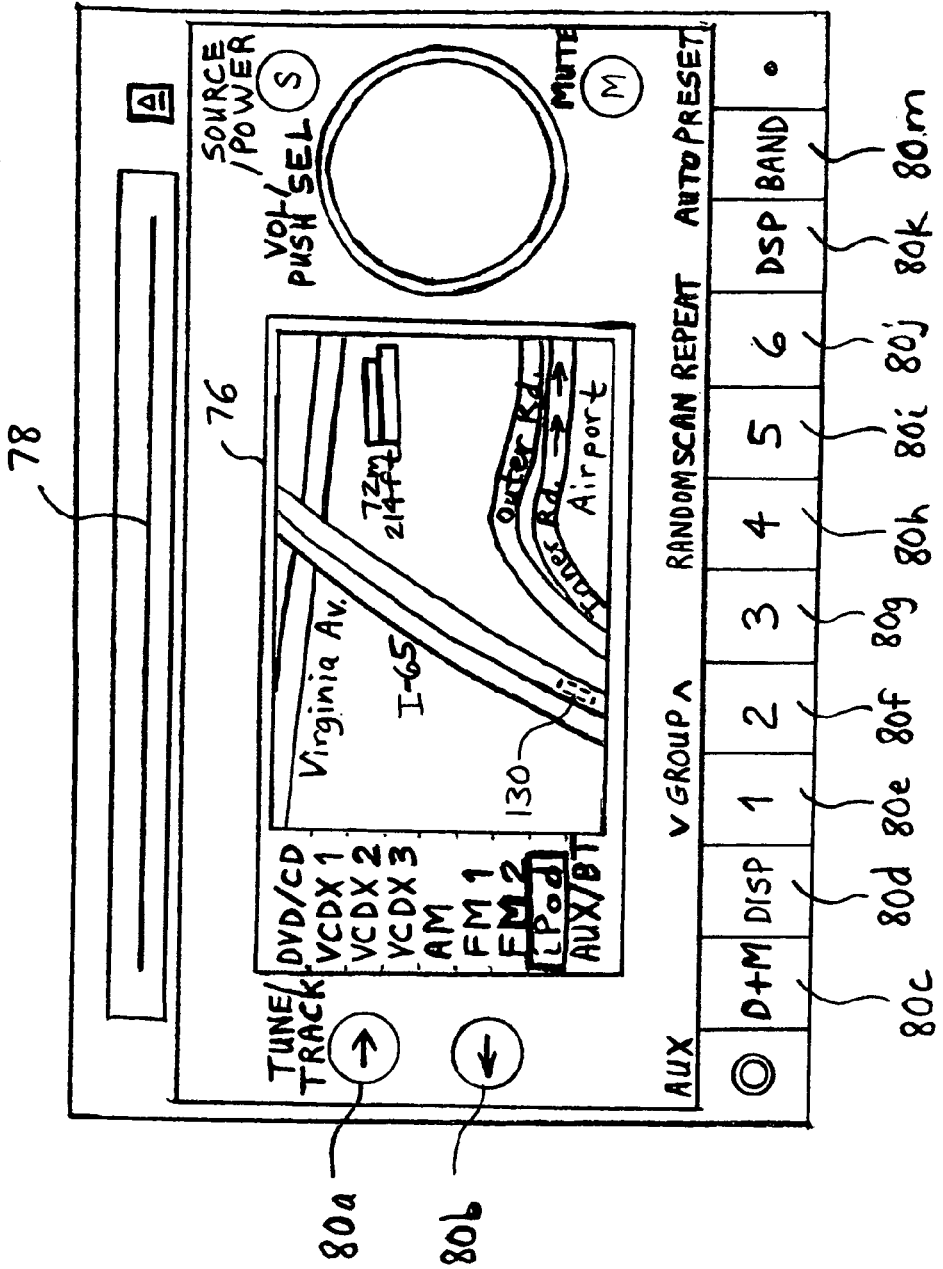
FIG. 7 is a plan view of the head unit of FIG. 1 in the map sub-mode of the direction mode.

At any time within direction mode 98, the user may press MAP pushbutton 80*k* to toggle back and forth between icon sub-mode 100 and map sub-mode 116. In map sub-mode 116, display screen 76 displays graphical map data 68 associated with the currently selected track. For example, if MAP pushbutton 80*k* is pressed with display screen 76 in its state shown in FIG. 6, display screen 76 switches to the graphical display shown in FIG. 7, in which map data 68 associated with Track 5 is illustrated. Pressing TRACK DOWN and TRACK UP pushbuttons 80*c*, 80*d* while in the map sub-mode 116 may enable the user to switch between graphical displays of map data 68 associated with the various tracks.

As indicated at 118 in FIG. 4, pressing DOWN pushbutton 80*b* while in direction mode 98 results in operation of system 10 returning to audio mode 84, in particular to AUX/BT sub-mode 92. Within AUX/BT sub-mode 92, it is determined at 120 whether an auxiliary input is present, in which case operation continues under auxiliary option 122. If no auxiliary input is present, then operation continues under Bluetooth audio option 124. Similarly, pressing UP pushbutton 80*a* while in direction mode 98 results in operation of system 10 returning to audio mode 84, in particular to radio sub-mode 86.

Figure 5:
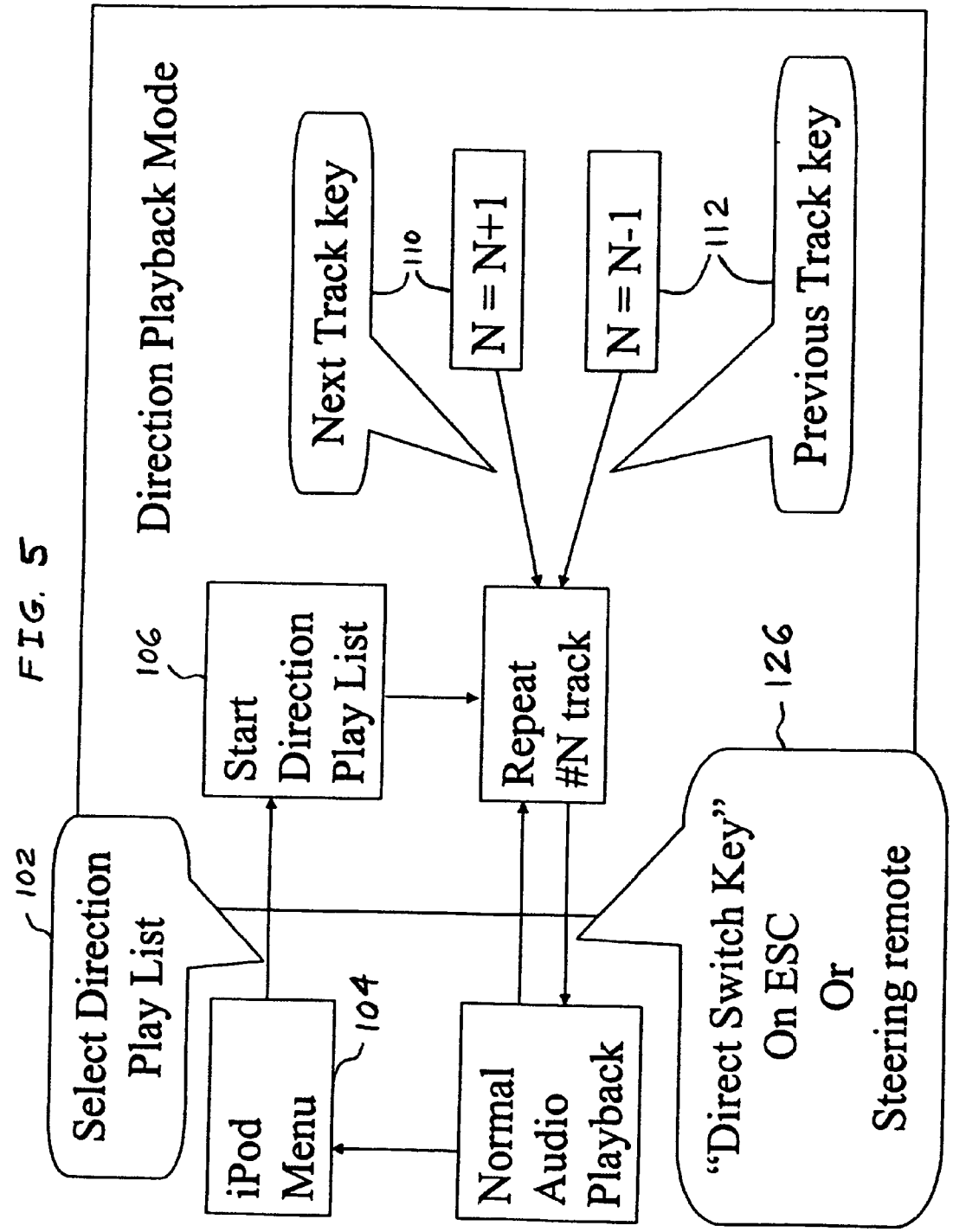
FIG. 5 is another flow chart of the operation of the navigation system of FIG. 1.

As indicated at 126 in FIGS. 4 and 5, the user may use Direct Switch pushbutton 80*m* on the entertainment system center (ESC), i.e., on head unit 32, to toggle between audio mode 84 and direction mode 98. When pushbutton 80*m* is actuated, operation may return to the particular sub-mode within audio mode 84 or direction mode 98 from which operation last exited. In addition, or alternatively, to Direct Switch pushbutton 80*m* being provided on head unit 32, it may also be provided on the steering wheel of vehicle 12.

Figure 8:
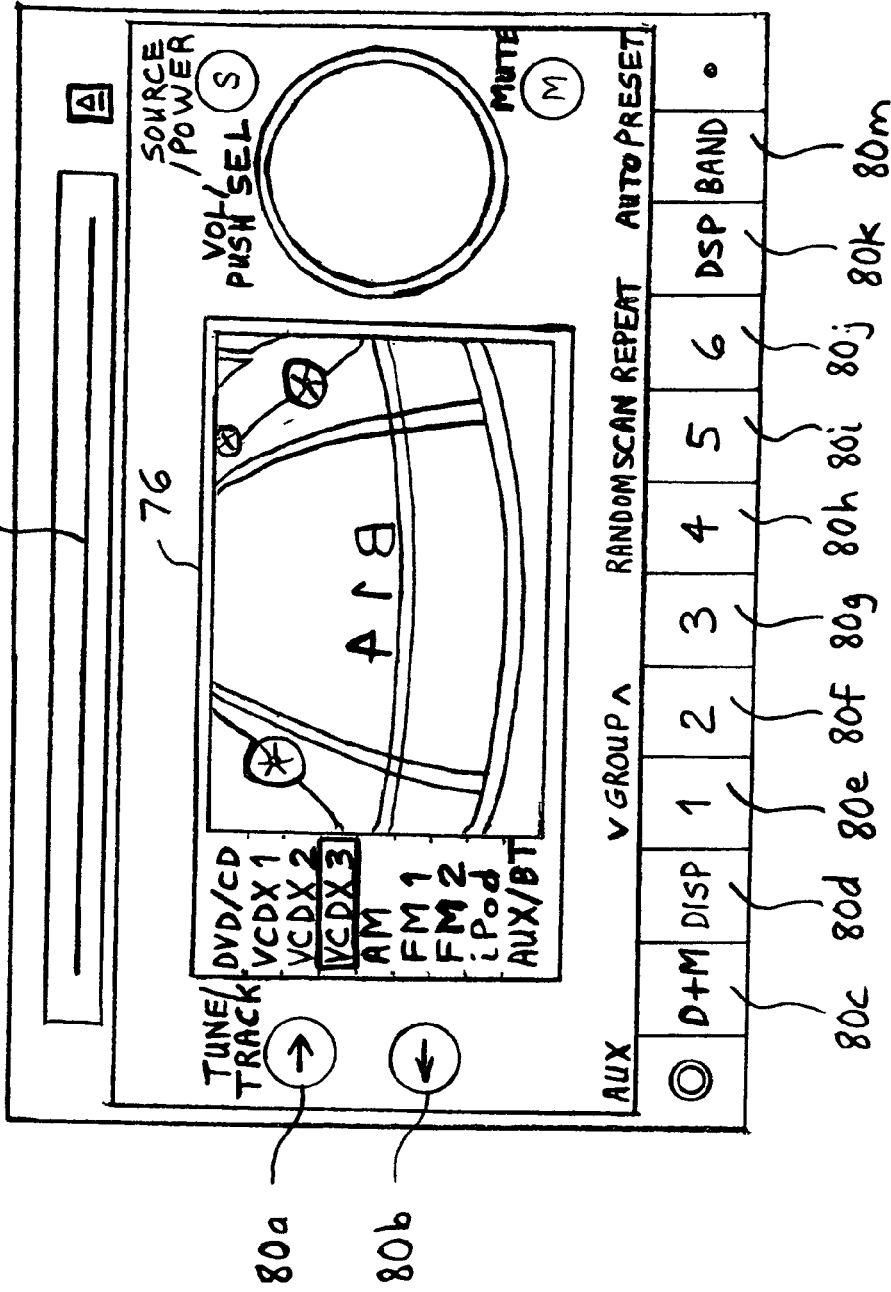
FIG. 8 is plan view of the head unit of FIG. 1 in the VCDX sub-mode of the audio mode.

In one embodiment, VCDX3 option 128 of VCDX sub-mode 88 includes providing on display screen 76 a real time view in the rearward direction from vehicle 12, as illustrated in FIG. 8. As shown, the image displayed on screen 76 may be a mirror image of the actual captured image in order to make the display more intuitive in that objects on the left-hand side of the screen will be to the driver's left in actuality, and objects on the right-hand side of the screen will be to the driver's right in actuality. A camera (not shown) may be provided on the rear of vehicle 12 in order to capture the image. In addition to selecting VCDX3 option 128 manually by operation of UP and DOWN pushbuttons 80*a*, 80*b*, it is also possible for system 10 to select VCDX3 option 128 automatically whenever vehicle 12 is placed in reverse gear.

In one embodiment, GPS 14 controls the switching of the current track whose navigation information is presented on display screen 76 and audibly played back on speaker 28. More particularly, the navigation information may include GPS coordinates associated with each track. The vehicle's current GPS coordinates as determined by GPS 14 may be compared with these stored GPS coordinates in order to determine which of the tracks is associated with GPS coordinates that most closely match the vehicle's current GPS coordinates. The navigation information associated with the best matching track may then be automatically displayed on screen 76 and played back on speaker 28.

In another embodiment, each track may have associated with it GPS coordinates that, once physically passed by vehicle 12 as vehicle 12 travels along the road, cause system 10 to automatically display and playback the navigation information that is associated with the next track in the sequence. The GPS control of the currently displayed track may be in addition, or in alternative, to the manual control of the currently displayed track via TRACK DOWN and TRACK UP pushbuttons 80c, 80d as described above. If the GPS control is in addition to the manual control, it may be possible for the user to manually override the GPS-based track control by use of TRACK DOWN and TRACK UP pushbuttons 80c, 80d.

The GPS may be used to make updates to the initial navigation information that is provided textually, graphically, or audibly with each new track. For example, a track as received from database 42 may initially textually and audibly indicate a certain distance to a next turnoff, such as "in 0.8 mile, take exit 17A". As the GPS senses the progression of vehicle 12 towards the turnoff, the textual and/or audible indications of distance may be automatically updated to read and state "in 0.7 mile, take exit 17A", "in 0.6 mile, take exit 17A", etc. Moreover, the graphical map information displayed on screen 76 in association with map data 68 may also be updated based on GPS information. In a particular embodiment, a vehicle icon 130 (FIG. 7) may be provided within the graphical display at a location that corresponds to the current location of vehicle 12 as determined by GPS 14. As the location of vehicle 12 changes as it travels along the road, the location of icon 130 within the graphical display may change correspondingly.

In yet another embodiment, GPS 14 may be used to determine the relationship between the current location of vehicle 12 and the vehicle's destination, or between the current location of vehicle 12 and some other point of reference. For example, after calculating the positional relationship, navigation system 10 may textually and/or audibly state, for example, "the destination is one-half mile to the right". Additionally, or alternatively, the navigation system may state the direction in terms of the cardinal directions, such as by stating "the destination is one-half mile to the southwest."

The present invention may also be applied to a head unit that does not include a display that is capable of displaying graphical or textual navigation information. Particularly, the navigation system may provide only audial navigation information, the playback of which may be controlled via GPS and/or manually by the use of pushbuttons. In one embodiment, the navigation information may be played back by any vehicle infotainment system having MP3/AAC/WMA (Windows Media Audio) capability.

Figure 9:
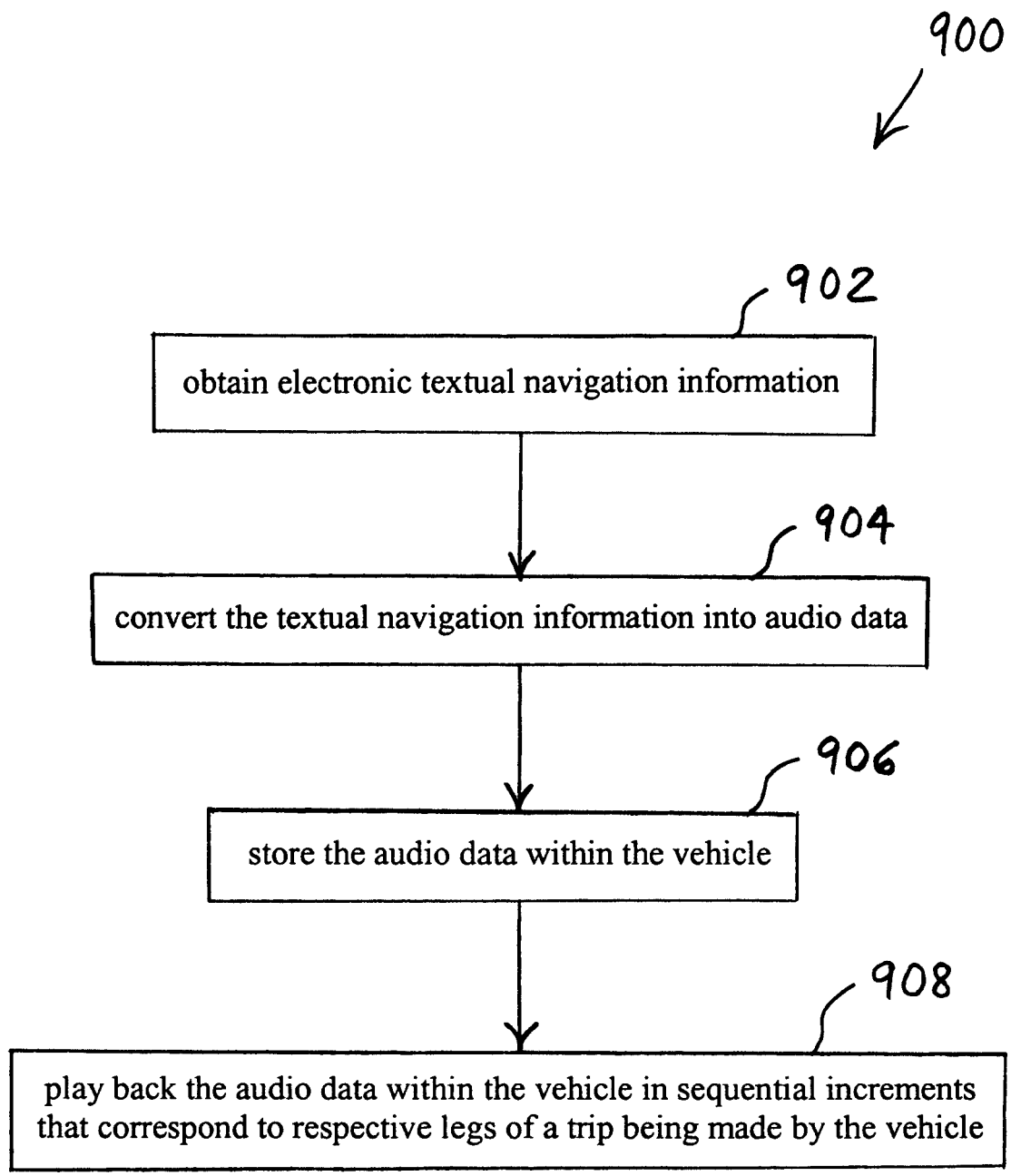
FIG. 9 is a flow chart of one embodiment of an automotive vehicle navigation method of the present invention.

FIG. 9 illustrates one embodiment of an automotive vehicle navigation method 900 of the present invention. In a first step 902, electronic textual navigation information is obtained. In the embodiment illustrated in FIG. 2, for example, text data 64 is retrieved from database 42 and downloaded to application 58 within PC 40. In a next step 904, the textual navigation information is converted into audio data. More particularly, in the embodiment shown in FIG. 2, speech text engine 60 may translate text data 64 into speech data, and then the speech data may be converted into a desired audio data format, such as MP3/AAC/WMA. Next, in step 906, the audio data is stored within the vehicle. As described above with reference to FIG. 1, the audio data may be stored in memory device 46 of vehicle 12 via antennae 48, 50 and link 22, via port 54, memory device 38 and port 26, or via port 54, memory device 38, PED 56 and port 30. In a final step 908, the audio data is played back within the vehicle in sequential increments that correspond to respective legs of a trip being made by the vehicle. For instance, in the embodiment illustrated in FIG. 2, the audio data is played back within vehicle 12 in sequentially ordered tracks, each of which may correspond to a respective portion of a trip that vehicle 12 is making.

Figure 10:
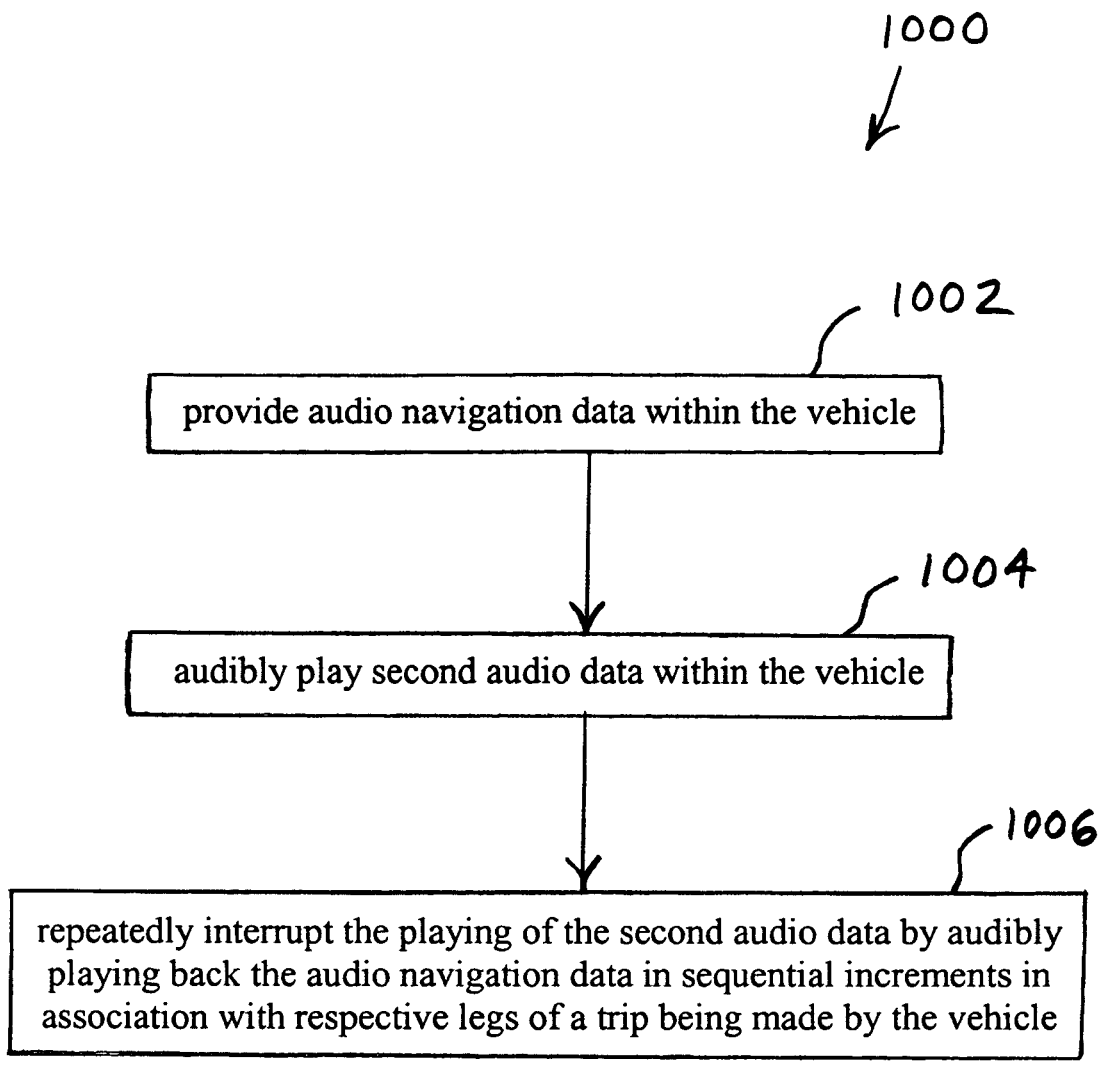
FIG. 10 is a flow chart of another embodiment of an automotive vehicle navigation method of the present invention.

FIG. 10 illustrates another embodiment of an automotive vehicle navigation method 1000 of the present invention. In a first step 1002, audio navigation data is provided within the vehicle. More particularly, as shown in FIG. 2, audio navigation data 66 is provided within vehicle 12. Next, in step 1004, second audio data is audibly played within the vehicle. For example, as shown in FIG. 4, radio sub-mode 86 of audio mode 84 is entered upon power ON 82, thereby causing audio data from the radio to be audibly played on speaker 28 within vehicle 12. In a final step 1006, the playing of the second audio data is repeatedly interrupted by audibly playing back the audio navigation data in sequential increments in association with respective legs of a trip being made by the vehicle. For example, by pressing Direct Switch pushbutton 80m on head unit 32, the user may enter direction mode 98 in which audio data 66 of the current track is played back to thereby interrupt the playing of the radio. The current track represents an increment of navigation data that is associated with a respective portion of the trip being made by vehicle 12. Upon completion of the playing back of the audio data of the current track, the system may return to playing the radio, even though display screen 76 may continue to display navigation information. When the user has reached the next leg of the trip and hence would like to receive the next track of navigation information, he may press TRACK UP pushbutton 80d to thereby commence visual and audio playback of the next track. As a result, the playing of the radio is again interrupted by audibly playing back the audio data associated with the new track. The process of repeatedly interrupting the radio, or some other audio source within audio mode 84, continues until the navigation information associated with the final leg of the trip has been played back. In another embodiment in which the timing of the playback of the next track is controlled according to the vehicle location as determined by GPS 14, the interruption of the radio or some other "second audio data" may occur automatically. That is, the playing of the second audio data may be interrupted via electronic control rather than requiring the user to press any button such as Direct Switch pushbutton 80m or TRACK UP pushbutton 80d.

Figure 11:
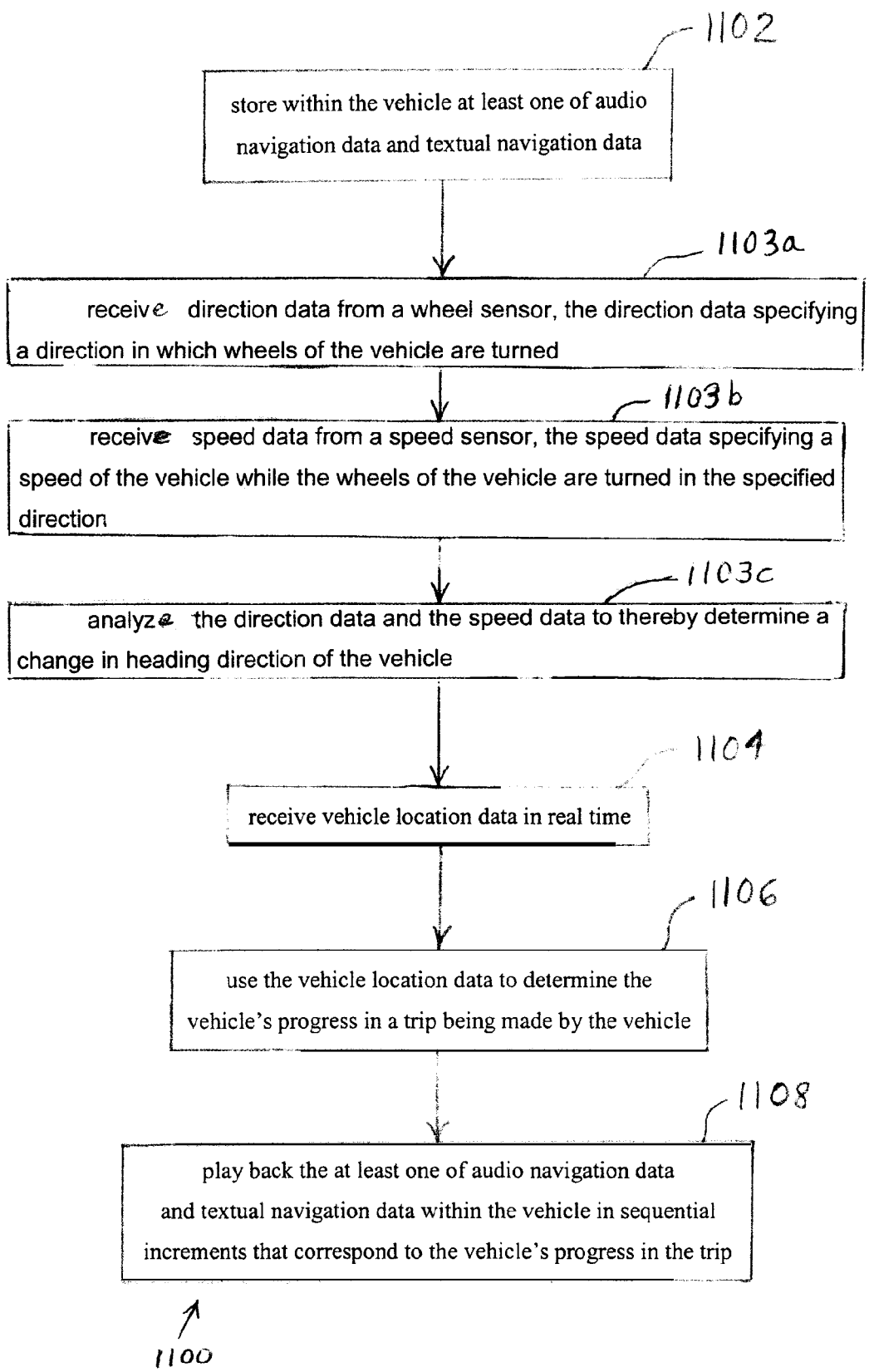
FIG. 11 is a flow chart of yet another embodiment of an automotive vehicle navigation method of the present invention.

FIG. 11 illustrates yet another embodiment of an automotive vehicle navigation method 1100 of the present invention. In a first step 1102, audio navigation data and/or textual navigation data is stored within vehicle 12. In the embodiment illustrated in FIG. 2, for example, audio data 66 and text data 64 are stored in memory device 46 within vehicle 12. In step 1103a, direction data is received from a wheel sensor, the direction data specifying a direction in which wheels of the vehicle are turned. In step 1103b, speed data is received from a speed sensor, the speed data specifying a speed of the vehicle while the wheels of the vehicle are turned in the specified direction. In step 1103c, the direction data and the speed data are analyzed to thereby determine a change in heading direction of the vehicle. In a next step 1104, vehicle location data is received in real time. As a particular example, GPS 14 provides processor 20 with vehicle location data in real time. Next, in step 1106, the vehicle location data is used to determine the vehicle's progress in a trip being made by the vehicle. GPS coordinates associated with each track may be provided in the navigation information. The vehicle's actual current GPS coordinates as determined by GPS 14 may be compared with these stored GPS coordinates in order to determine which of the tracks the vehicle's current location corresponds to. Thus, the vehicle's progress along the trip the vehicle is taking may be determined. In a final step 1108, the audio navigation data and/or the textual navigation data is played back within the vehicle in sequential increments that correspond to the vehicle's progress in the trip. For instance, in the embodiment illustrated in FIG. 2, audio data 66 and text data 64 are played back within vehicle 12 in sequentially ordered tracks, each of which may correspond to a respective portion of a trip that vehicle 12 is making.

The graphical and textual indications have been described herein as being provided on a head unit. However, in another embodiment they are provided on a windshield via a heads-up display.

While the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An automotive vehicle navigation method, said method comprising the steps of:
   obtaining electronic textual navigation information;
   converting the textual navigation information into audio data;
   storing the audio data within the vehicle;
   playing back the audio data within the vehicle in sequential increments that correspond to respective legs of a trip being made by the vehicle;
   storing the electronic textual navigation information within the vehicle;
   playing back the electronic textual navigation information within the vehicle in sequential increments that correspond to the respective legs of the trip being made by the vehicle, wherein the audio data and the electronic textual navigation information are stored and played back together in a sequential tracks corresponding to the respective legs of the trip;
   obtaining electronic graphical navigation information;
   storing the electronic graphical navigation information within the vehicle;
   playing back the electronic graphical navigation information within the vehicle in sequential increments that correspond to the respective legs of the trip being made by the vehicle; and
   selectively switching between the playing back of the electronic textual navigation information and the playing back of the electronic graphical navigation information.

2. An automotive vehicle navigation method, said method comprising the steps of:
   storing within the vehicle at least one of audio navigation data and textual navigation data;
   receiving direction from a wheel sensor, the direction data specifying a directing in which wheels of the vehicle are turned;
   receiving speed data from a speed sensor, the speed data specifying a speed of the vehicle while the wheels of the vehicle are turned in the specified direction;
   analyzing the direction data and the speed data to thereby determine a change in heading direction of the vehicle;
   receiving vehicle location data in real time from a GPS;
   using the vehicle location data to determine the vehicle's progress in a trip being made by the vehicle;
   playing back the at least one of the audio navigation data and textual navigation data on a head unit within the vehicle in sequential increments that correspond to the vehicle's progress in the trip;
   calculating a positional relationship between a current location of the vehicle and a destination of the vehicle; and
   using a navigation system to textually and/or audibly stat a distance and relative direction of the destination relative to the changed heading direction of the vehicle, the relative direction being stated in terms of cardinal directions.

* * * * *